United States Patent
Zhao (10) Patent No.: US 11,106,102 B2
(45) Date of Patent: Aug. 31, 2021

(54) DISPLAY SUBSTRATE, METHOD FOR MANUFACTURING SAME, AND DISPLAY DEVICE

(71) Applicant: BOE Technology Group Co., Ltd., Beijing (CN)

(72) Inventor: Weili Zhao, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/713,331

(22) Filed: Dec. 13, 2019

(65) Prior Publication Data
US 2020/0241348 A1    Jul. 30, 2020

(30) Foreign Application Priority Data

Jan. 30, 2019 (CN) .......................... 201910092057.1

(51) Int. Cl.
G02F 1/137 (2006.01)
G02F 1/1335 (2006.01)
G02F 1/13357 (2006.01)
G02F 1/13363 (2006.01)

(52) U.S. Cl.
CPC ...... G02F 1/13718 (2013.01); G02F 1/13363 (2013.01); G02F 1/133514 (2013.01); G02F 1/133528 (2013.01); G02F 1/133603 (2013.01); G02F 1/133541 (2021.01); G02F 1/133614 (2021.01); G02F 1/133638 (2021.01)

(58) Field of Classification Search
CPC .................................................. G02F 1/13718
See application file for complete search history.

(56) References Cited

U.S. PATENT DOCUMENTS

| 2004/0095531 A1* | 5/2004 | Jiang ..................... B82Y 15/00 349/115 |
| 2005/0270449 A1* | 12/2005 | Koma ............... G02F 1/133555 349/114 |
| 2006/0240286 A1 | 10/2006 | Park et al. |
| 2015/0070628 A1 | 3/2015 | Suzuki et al. |

(Continued)

FOREIGN PATENT DOCUMENTS

| CN | 1854853 A | 11/2006 |
| CN | 104035232 A | 9/2014 |

(Continued)

OTHER PUBLICATIONS

First office action of Chinese application No. 201910092057.1 dated Mar. 8, 2021.

*Primary Examiner* — Sang V Nguyen
(74) *Attorney, Agent, or Firm* — Fay Sharpe LLP (57) ABSTRACT

The present disclosure discloses a display substrate, a method for manufacturing same, and a display device, relating to the field of display technologies. The display substrate comprises a base substrate, and a transflective layer and a quantum dot (QD) structure that are sequentially stacked in a direction away from the base substrate. The QD structure is configured to emit light in a second wavelength range under excitation by light in a first wavelength range. The second wavelength range is outside the first wavelength range. The transflective layer is configured to reflect the light in the first wavelength range and transmit the light in the second wavelength range.

20 Claims, 8 Drawing Sheets

(56) References Cited

U.S. PATENT DOCUMENTS

| | | |
|---|---|---|
| 2015/0346536 A1 | 12/2015 | Wang et al. |
| 2016/0147101 A1 | 5/2016 | Saneto et al. |
| 2016/0154275 A1 | 6/2016 | Saneto et al. |
| 2016/0170262 A1 | 6/2016 | Saneto et al. |
| 2018/0120631 A1* | 5/2018 | Lee .......................... G02B 5/20 |
| 2018/0173053 A1* | 6/2018 | Yoon ................. G02F 1/133617 |
| 2018/0224701 A1 | 8/2018 | Shin et al. |
| 2019/0250464 A1* | 8/2019 | Kuo .................. G02F 1/133617 |
| 2019/0325791 A1* | 10/2019 | Lin .......................... F21V 9/08 |

FOREIGN PATENT DOCUMENTS

| | | | | |
|---|---|---|---|---|
| CN | 104254802 A | 12/2014 | | |
| CN | 204439978 U | 7/2015 | | |
| CN | 105408810 A | 3/2016 | | |
| CN | 105452945 A | 3/2016 | | |
| CN | 105683824 A | 6/2016 | | |
| CN | 106527008 A | 3/2017 | | |
| CN | 107424524 A | 12/2017 | | |
| CN | 108398840 A | 8/2018 | | |
| CN | 108766273 A | 11/2018 | | |
| CN | 108831317 A | 11/2018 | | |
| CN | 109683378 A | * | 4/2019 | ........... G02F 1/1335 |
| CN | 110221477 | * | 9/2019 | ........... G02F 1/1343 |
| EP | 3109543 B1 | 8/2018 | | |

* cited by examiner

DISPLAY SUBSTRATE, METHOD FOR MANUFACTURING SAME, AND DISPLAY DEVICE

The present application claims priority to Chinese Patent Application No. 201910092057.1, filed on Jan. 30, 2019 and entitled "DISPLAY SUBSTRATE, METHOD FOR MANUFACTURING SAME, AND DISPLAY DEVICE", the entire contents of which are incorporated herein by reference.

TECHNICAL FIELD

The present disclosure relates to the field of display technologies, and more particularly to a display substrate, a method for manufacturing same, and a display device.

BACKGROUND

Quantum dots (QDs), also referred to as semiconductor light-emitting nanocrystals, generally have particle sizes between 1 nanometer and 10 nanometers. Upon being excited by a light source, QDs can emit light by themselves to obtain light with relatively high color purity. Therefore, QDs are widely applied to the field of wide color gamut display.

SUMMARY

Embodiments of the present disclosure provide a display substrate, a method for manufacturing same, and a display device. The technical solution are as follows:

In a first aspect, there is provided a display substrate, including a base substrate, and a transflective layer and a QD structure that are sequentially stacked in a direction away from the base substrate, wherein the QD structure is configured to emit light in a second wavelength range under excitation by light in a first wavelength range, the second wavelength range is outside the first wavelength range, and the transflective layer is configured to reflect the light in the first wavelength range and transmit the light in the second wavelength range.

Optionally, the transflective layer comprises at least one of a left-handed cholesteric phase liquid crystal layer and a right-handed cholesteric phase liquid crystal layer.

Optionally, the display substrate satisfies at least one of the following conditions: an orthographic projection of the QD structure onto the base substrate is located in an orthographic projection of the transflective layer onto the base substrate.

Optionally, the light in the first wavelength range comprises blue light.

Optionally, the QD structure comprises at least one of a red QD block and a green QD block;

Optionally, the display substrate further comprises a target color filter layer, the target color filter layer is located between the transflective layer and the base substrate, and the target color filter layer is configured to absorb the light in the first wavelength range.

Optionally, the QD structure comprises at least one of a red QD block and a green QD block; and the target color filter layer includes at least one color filter block which is in a one-to-one correspondence with the at least one QD block, and each color filter block is configured to transmit light emitted by a corresponding QD block and absorb light different from the light emitted by the corresponding QD block.

Optionally, the display substrate further includes a blue QD block located in the same layer as the QD structure.

Optionally, the display substrate satisfies any of the following conditions:

a thickness of the blue QD block is equal to a sum of a thickness of the QD structure and a thickness of the transflective layer; and the display substrate further includes a planarization layer located between the blue QD block and the base substrate, and a sum of the thickness of the blue QD block and a thickness of the planarization layer is equal to a sum of the thickness of the QD structure and the thickness of the transflective layer.

Optionally, the display substrate further includes a blue color filter block located between the blue QD block and the base substrate; and the blue color filter block is configured to transmit light emitted by the blue QD block and absorb light different from the light emitted by the blue QD block.

Optionally, the display substrate further includes a planarization layer located in the same layer as the QD structure, and the thickness of the planarization layer is equal to a sum of the thickness of the QD structure and the thickness of the transflective layer.

Optionally, the display substrate further includes a circular polarizer located on a side, away from the transflective layer, of the base substrate.

Optionally, the circular polarizer satisfies at least one of the following conditions:

the circular polarizer includes a quarter-wave plate and a linear polarizer sequentially arranged in a direction away from the base substrate; and the circular polarizer is a left-handed circular polarizer.

Optionally, the light in the first wavelength range includes blue light, the transflective layer includes at least one of a left-handed cholesteric phase liquid crystal layer and a right-handed cholesteric phase liquid crystal layer, an orthographic projection of the QD structure onto the base substrate is located in an orthographic projection of the transflective layer onto the base substrate, the display substrate further includes a circular polarizer located on a side, away from the transflective layer, of the base substrate, the circular polarizer includes a quarter-wave plate and a linear polarizer sequentially arranged in a direction away from the base substrate, and the circular polarizer is a left-handed circular polarizer;

the display substrate satisfies any of the following conditions:

the display substrate further includes a planarization layer, the planarization layer and the QD structure are located in the same layer, and the thickness of the planarization layer is equal to a sum of the thickness of the QD structure and the thickness of the transflective layer; and the display substrate further includes a blue QD block, the planarization layer, and a blue color filter block, and the blue QD block, the planarization layer and the blue color filter block are sequentially arranged in a direction toward the base substrate, the blue QD block and the QD structure are located in the same layer, a sum of the thickness of the blue QD block and the thickness of the planarization layer is equal to the sum of the thickness of the QD structure and the thickness of the transflective layer, the blue color filter block is configured to transmit light emitted by the blue QD block and absorb light different from the light emitted by the blue QD block, and the blue QD block is configured to emit blue light under excitation by light in the first wavelength range.

In a second aspect, there is provided a method for manufacturing a display substrate, wherein the display substrate includes a plurality of QD blocks, and the method includes:

providing a base substrate;

forming a transflective layer on the base substrate; and forming a QD structure on the base substrate on which the transflective layer has been formed, wherein the QD structure is configured to emit light in a second wavelength range under excitation by light in a first wavelength range, the second wavelength range is outside the first wavelength range, and the transflective layer is configured to reflect the light in the first wavelength range and transmit the light in the second wavelength range.

Optionally, the forming a transflective layer on the base substrate includes:

forming a cholesteric phase liquid crystal layer on the base substrate by spin coating; and removing the cholesteric phase liquid crystal layer in a remaining region by an exposure and development process, wherein the remaining region is a region other than a region in which the QD blocks are to be formed.

Optionally, the forming a cholesteric phase liquid crystal layer on the base substrate by spin coating includes:

forming a left-handed cholesteric phase liquid crystal layer on the base substrate by spin coating; and forming a right-handed cholesteric phase liquid crystal layer on a side, away from the base substrate, of the left-handed cholesteric phase liquid crystal layer by spin coating; or forming a right-handed cholesteric phase liquid crystal layer on the base substrate by spin coating; and forming a left-handed cholesteric phase liquid crystal layer on a side, away from the base substrate, of the right-handed cholesteric phase liquid crystal layer by spin coating.

Optionally, after the forming a transflective layer on the base substrate, the method further includes:

forming a planarization layer on the base substrate on which the transflective layer has been formed.

Optionally, prior to the forming a transflective layer on the base substrate, the method further includes:

forming a target color filter layer on the base substrate; and the forming a transflective layer on the base substrate includes:

forming the transflective layer on a side, away from the base substrate, of the target color filter layer.

In a third aspect, there is provided a display device, including the display substrate according to any of the first aspect.

Optionally, the display device further includes a light-emitting substrate, wherein the light-emitting substrate is located on a side, away from the base substrate, of the plurality of QD blocks, and the light-emitting substrate is configured to provide light in a first wavelength range to the display substrate.

Optionally, the light in the first wavelength range includes blue light.

Optionally, the light-emitting substrate includes an auxiliary substrate and at least one light-emitting unit located on the auxiliary substrate, the at least one light-emitting unit is in a one-to-one correspondence with at least one QD block in the display substrate, and the light-emitting unit is configured to provide the light in the first wavelength range to a corresponding QD block.

Optionally, the light-emitting unit is any one of a micro light-emitting diode (LED) and a mini LED.

DETAILED DESCRIPTION

The present disclosure will be described in further detail with reference to the accompanying drawings, to present the objects, technical solutions, and advantages of the present disclosure more clearly.

A QD color film substrate is known in the related art. The QD color film substrate includes a base substrate and a QD structure disposed on the base substrate. The QD structure includes a plurality of QD blocks arranged in an array. The plurality of QD blocks may include a red QD block, a green QD block, and a blue QD block. Currently, a backlight source that can emit blue light is usually disposed on a side of the QD color film substrate. The blue light provided by the backlight source excites QDs in the QD structure to emit light. The red QD block emits red light under the excitation by the blue light. The green QD block emits green light under the excitation by the blue light. The blue QD block emits blue light under the excitation by the blue light.

However, a part of blue light provided by the backlight source may be transmitted through a QD structure. That is, the part of blue light cannot excite a QD block to emit light. As a result, the utilization of blue light in related art is relatively low.

Figure 1:
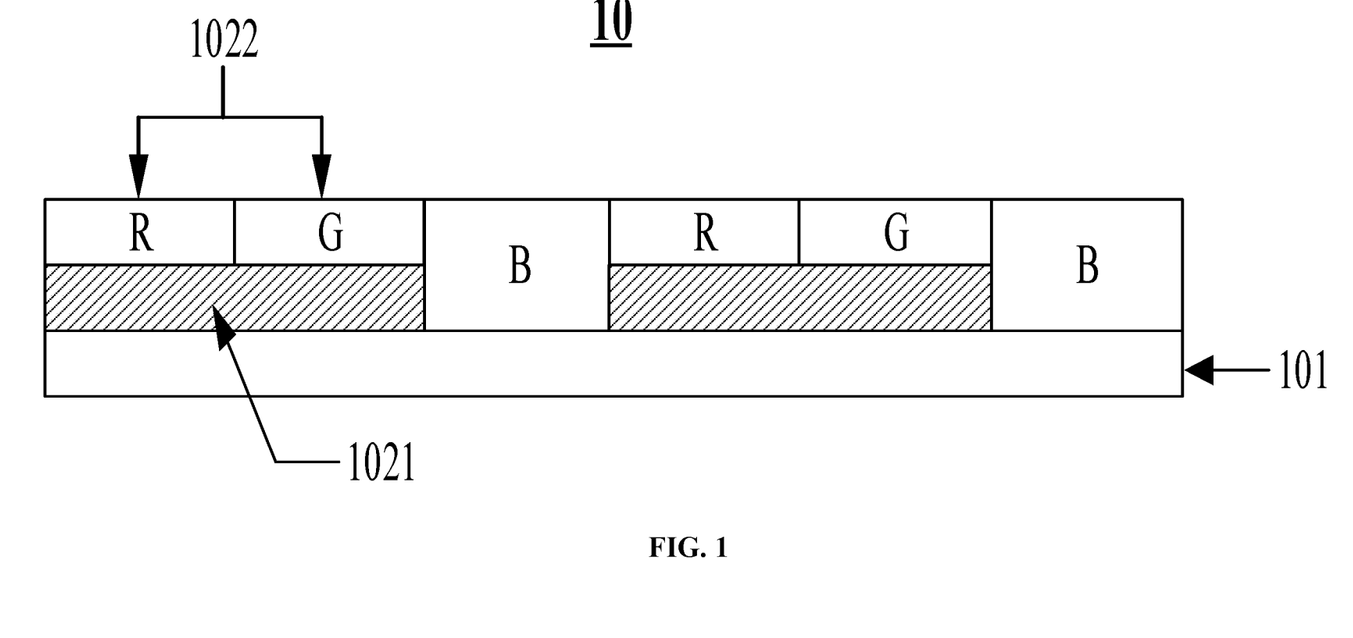
FIG. 1 is a schematic structural diagram of a display substrate according to some embodiments of the present disclosure.

FIG. 1 is a schematic structural diagram of a display substrate according to some embodiments of the present disclosure. As shown in FIG. 1, a display substrate 10 includes: a base substrate 101, and a transflective layer 1021 and a QD structure 1022 that are sequentially stacked in a direction away from the base substrate 101. The QD structure 1022 is configured to emit light in a second wavelength range under excitation by light in a first wavelength range. The second wavelength range and the first wavelength range do not have an overlapping range (that is, the second wavelength range is outside the first wavelength range, and the color of the light in the second wavelength range is different from the color of the light in the first wavelength range). The transflective layer 1021 is configured to reflect the light in the first wavelength range and transmit the light in the second wavelength range.

In summary, the display substrate provided in some embodiments of the present disclosure includes a transflective layer and a QD structure that are sequentially stacked in a direction away from a base substrate. When light in a first wavelength range enters from a side, away from the transflective layer, of the QD structure, the QD structure can be excited by the light in the first wavelength range to emit light in a second wavelength range. The transflective layer can reflect the light in the first wavelength range and transmit the light in the second wavelength range. Therefore, after a part of the light in the first wavelength range is transmitted through the QD structure, the transflective layer can reflect the part of the light in the first wavelength range to the QD structure, so as to excite the QD structure to emit light. On one hand, the utilization of the light in the first wavelength range can be improved. On the other hand, a cross-color interference phenomenon, caused by the emergence of light in the first wavelength range, transmitted through the QD structure, from the base substrate, can be avoided, thereby ensuring the display effect of the display substrate.

Optionally, an orthographic projection of the transflective layer 1021 onto the base substrate 101 covers an orthographic projection of the QD structure 1022 onto the base substrate 101. This means that the orthographic projection of the QD structure 1022 onto the base substrate 101 is located inside the orthographic projection of the transflective layer 1021 onto the base substrate 101. In this case, a relatively large part of the light in the first wavelength range transmitted through the QD structure 1022 can be reflected by the transflective layer 1021 to the QD structure 1022, thereby further improving the display effect of a display substrate.

Optionally, the transflective layer 1021 is a cholesteric phase liquid crystal layer. The cholesteric phase liquid crystal layer includes at least one of a left-handed cholesteric phase liquid crystal layer and a right-handed cholesteric phase liquid crystal layer. That is, the cholesteric phase liquid crystal layer is a left-handed cholesteric phase liquid crystal layer, or the cholesteric phase liquid crystal layer is a right-handed cholesteric phase liquid crystal layer. Alternatively, the cholesteric phase liquid crystal layer is a stacked structure of a left-handed cholesteric phase liquid crystal layer and a right-handed cholesteric phase liquid crystal layer. When the cholesteric phase liquid crystal layer is a stacked structure of a left-handed cholesteric phase liquid crystal layer and a right-handed cholesteric phase liquid crystal layer, the left-handed cholesteric phase liquid crystal layer and the right-handed cholesteric phase liquid crystal layer may be sequentially stacked in a direction toward or away from the base substrate 101. It should be noted that the cholesteric phase liquid crystal layer can reflect light whose optical rotation direction is the same as that of a helical axis of cholesteric phase liquid crystal and transmit light whose optical rotation direction is opposite to that of the helical axis of the cholesteric phase liquid crystal. For example, the left-handed cholesteric phase liquid crystal layer can reflect left-handed light and transmit right-handed light. The right-handed cholesteric phase liquid crystal layer can reflect right-handed light and transmit left-handed light.

Since the light in the first wavelength range is usually natural light formed by superimposing left-handed light and right-handed light, the arrangement of the cholesteric phase liquid crystal layer can at least reflect a part of the light in the first wavelength range. The left-handed cholesteric phase liquid crystal layer can reflect left-handed light components of the light in the first wavelength range and the right-handed cholesteric phase liquid crystal layer can reflect right-handed light components of the light in the first wavelength range.

Optionally, when the transflective layer 1021 is a cholesteric phase liquid crystal layer, a helical pitch of cholesteric phase liquid crystal may be set to adjust the wavelength range of reflected light. Details are not described herein in the embodiments of the present disclosure.

Optionally, the light in the first wavelength range includes blue light. The light in the first wavelength range may not include blue light, and may include, for example, purple light. This is not limited in the embodiments of the present disclosure.

Optionally, the QD structure 1022 includes at least one of a red QD block R and a green QD block G. For example, referring to FIG. 1, the QD structure 1022 includes a red QD block R and a green QD block G. The red QD block R is configured to emit red light under excitation by the light in the first wavelength range (for example, blue light). The green QD block G is configured to emit green light under excitation by the light in the first wavelength range (for example, blue light). It should be noted that in the embodiments of the present disclosure, as an example, the light in the first wavelength range includes blue light, and the QD structure 1022 includes at least one of a red QD block R and a green QD block G. Optionally, it is also possible that the light in the first wavelength range includes green light, and the QD structure 1022 includes at least one of a red QD block and a blue QD block. Alternatively, it may also be possible that the light in the first wavelength range includes red light, and the QD structure may include at least one of a green QD block and a blue QD block. This is not limited in the embodiments of the present disclosure.

Further, referring to FIG. 1, the display substrate may further include a blue QD block B located on the base substrate 101. The blue QD block B may be located in the same layer as the above QD structure 1022. It should be noted that the blue QD block is configured to emit blue light under excitation by the light in the first wavelength range. Therefore, the display color gamut of the blue light can be improved.

In a possible structure, referring to FIG. 1, the thickness of the blue QD block B is equal to a sum of the thickness of the transflective layer 1021 and the thickness of the QD structure 1022.

Figure 2:
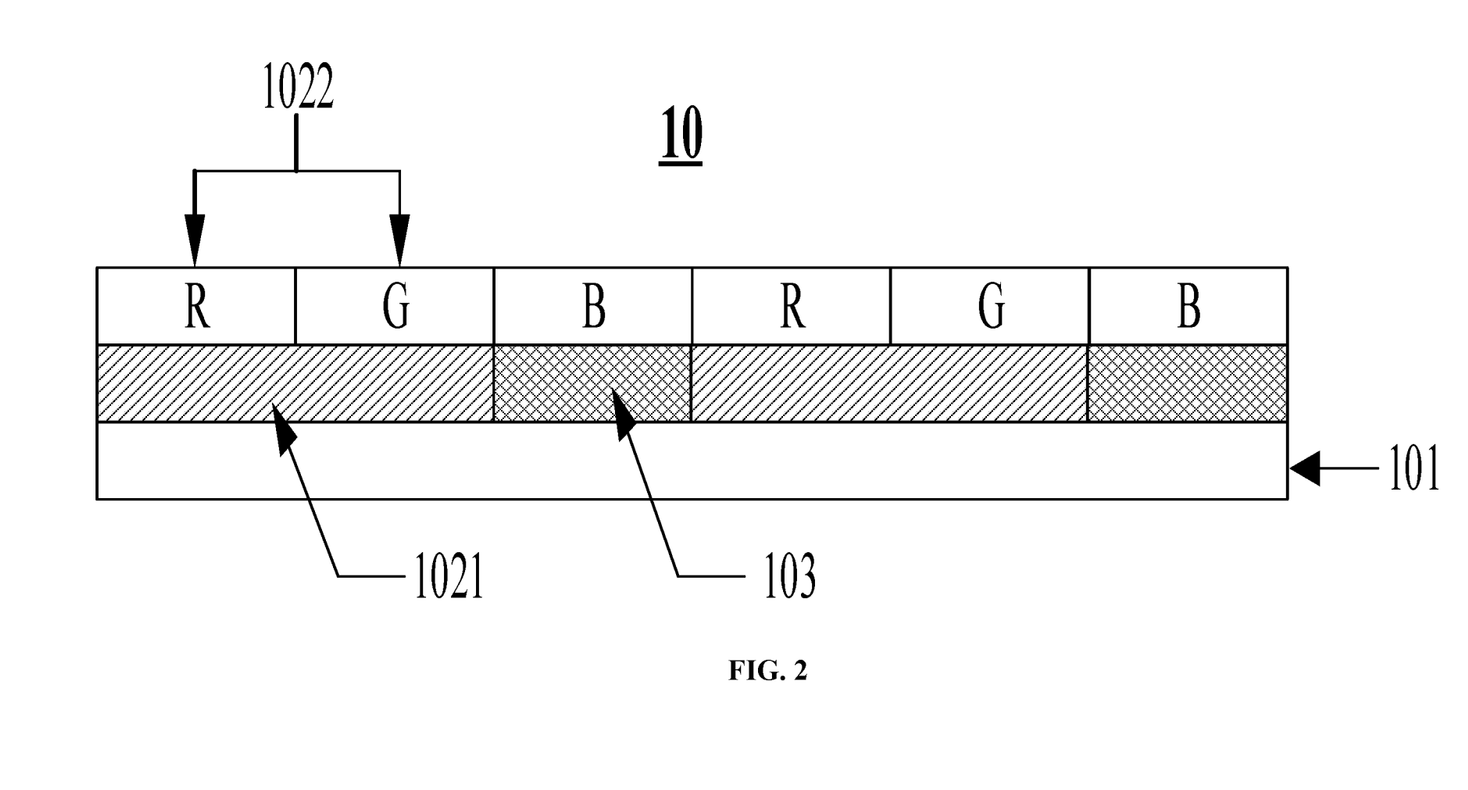
FIG. 2 is a schematic structural diagram of another display substrate according to some embodiments of the present disclosure.

In another possible structure, referring to FIG. 2, a planarization layer 103 is disposed between the blue QD block B and the base substrate 101. The planarization layer 103 and the transflective layer 1021 may be located in the same layer. A sum of the thickness of the blue QD block B and the thickness of the planarization layer 103 is equal to a sum of the thickness of the transflective layer 1021 and the thickness of the QD structure 1022.

In still another possible structure, the planarization layer 103 in FIG. 2 may be disposed as a whole layer. In this case, the planarization layer 103 is still located between the blue QD block B and the base substrate 101, and the planarization layer 103 is further located between the QD structure 1022 and the base substrate 101. This is not limited in the embodiments of the present disclosure.

It should be noted that since there is no transflective layer 1021 disposed between the blue QD block B and the base substrate 101, the surface flatness of the display substrate could be achieved by enabling the thickness of the blue QD block B to be equal to the sum of the thickness of the transflective layer 1021 and the thickness of the QD structure 1022 or arranging the planarization layer 103 between the blue QD block B and the base substrate 101.

Figure 3:
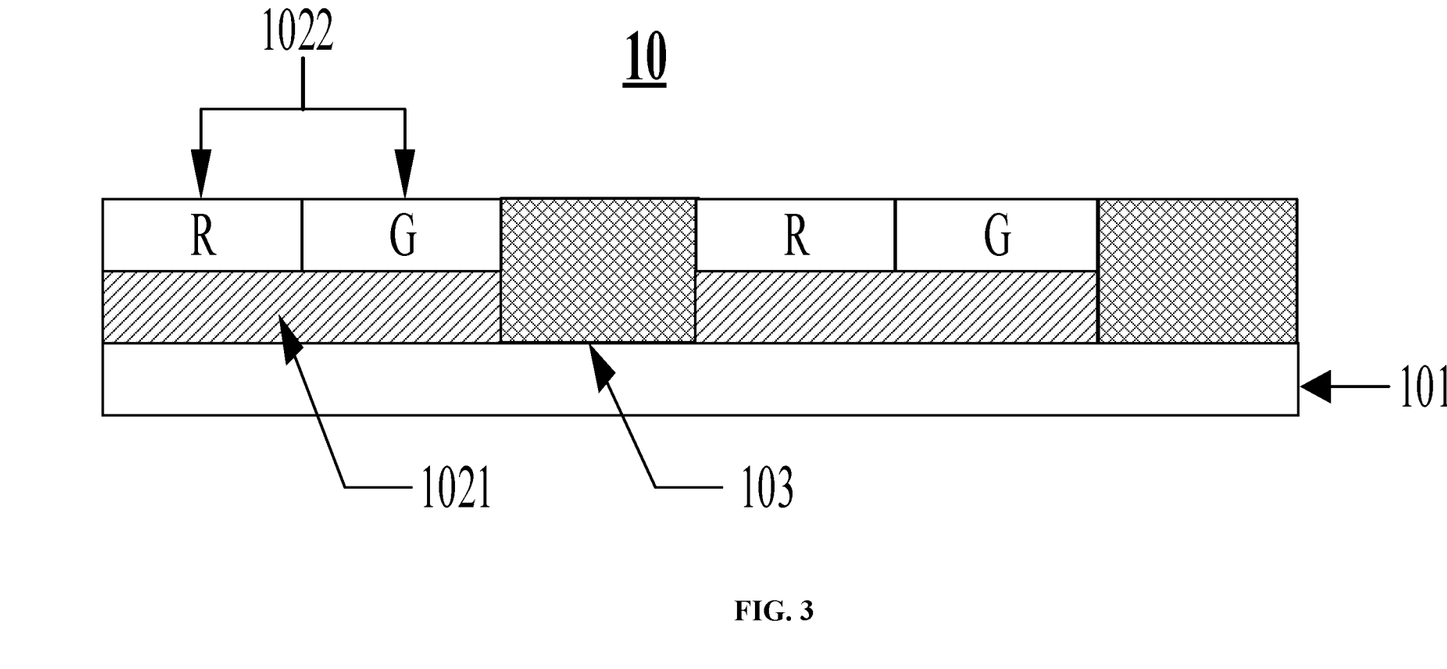
FIG. 3 is a schematic structural diagram of still another display substrate according to some embodiments of the present disclosure.

In the foregoing embodiments, as an example, the display substrate includes a blue QD block. Optionally, the display substrate may not include blue QD block. This is not limited in the embodiments of the present disclosure. For example, FIG. 3 is a schematic structural diagram of still another display substrate according to some embodiments of the present disclosure. As shown in FIG. 3, the planarization layer 103 may be disposed in a region in which the blue QD block B is located in FIG. 2. The thickness of the planarization layer 103 is equal to the sum of the thickness of the transflective layer 1021 and the thickness of the QD structure 1022.

Figure 4:
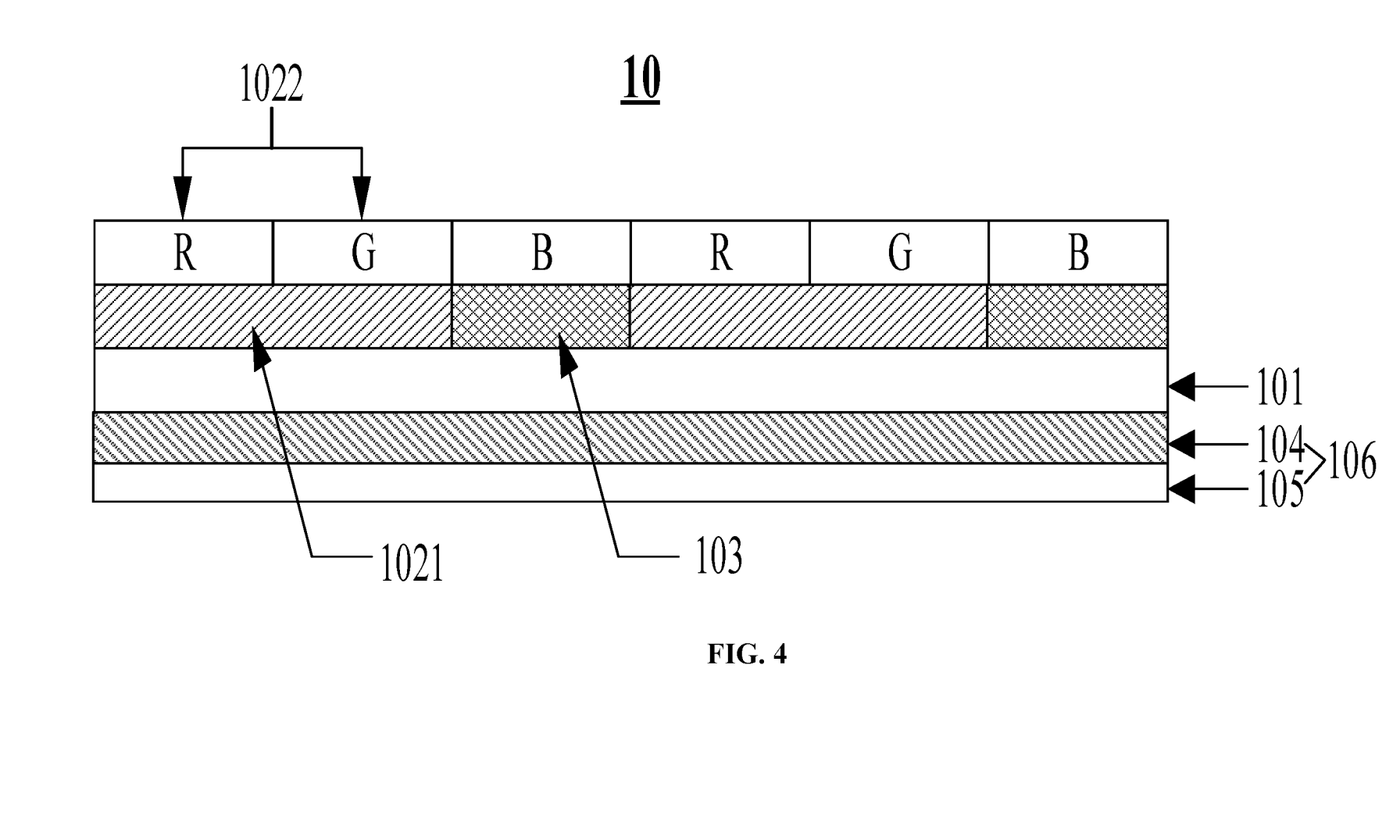
FIG. 4 is a schematic structural diagram of yet another display substrate according to some embodiments of the present disclosure.

Optionally, FIG. 4 is a schematic structural diagram of yet another display substrate according to some embodiments of the present disclosure. As shown in FIG. 4, the display substrate 10 further includes a circular polarizer 106 located on a side, away from the transflective layer 1021, of the base substrate 101. For example, the circular polarizer 106 may include a quarter-wave plate 104 and a linear polarizer 105 sequentially arranged in a direction away from the base substrate 101. Optionally, the circular polarizer 106 may not include a quarter-wave plate 104 or a linear polarizer 105, but instead is completely formed by liquid crystal. This is not limited in the embodiments of the present disclosure. It should be noted that the circular polarizer 106 can prevent external intense light from entering a metal structure inside a display device and being reflected, which would result in the decrease of the contrast. Details of the reflection prevention principle of the circular polarizer are not described herein in the embodiments of the present disclosure.

Optionally, the circular polarizer 106 may be a left-handed circular polarizer (which can transmit left-handed light) or a right-handed circular polarizer (which can transmit right-handed light). This is not limited in the embodiments of the present disclosure.

Figure 5:
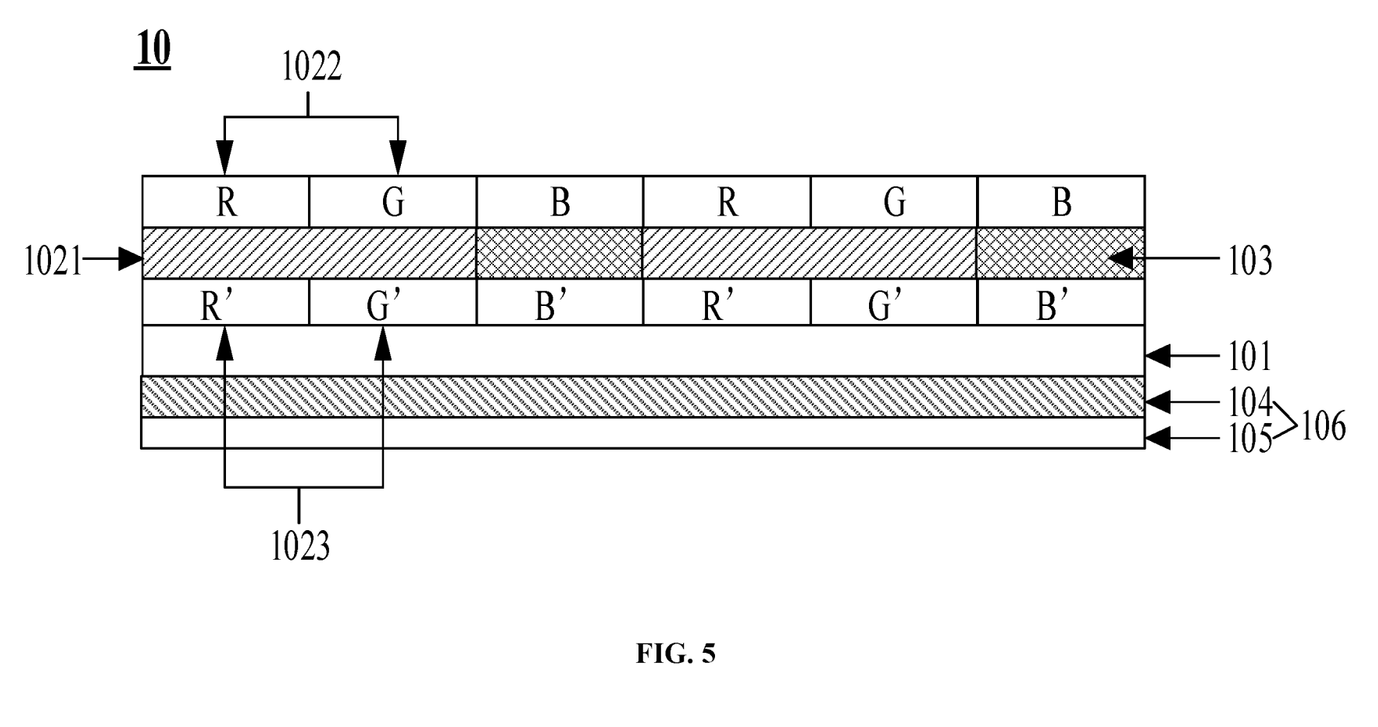
FIG. 5 is a schematic structural diagram of a further display substrate according to some embodiments of the present disclosure.

Optionally, FIG. 5 is a schematic structural diagram of a further display substrate according to some embodiments of the present disclosure. As shown in FIG. 5, the display substrate further includes a target color filter layer 1023. The target color filter layer 1023 is located between the transflective layer 1021 and the base substrate 101. The target color filter layer 1023 is configured to absorb the light in the first wavelength range. In this case, the target color filter layer can absorb the light in the first wavelength range in external environment light, so as to prevent the light in the first wavelength range in the external environment light from entering the transflective layer 1021 through the base substrate and being reflected by the transflective layer 1021 to leave the display substrate 10, thereby protecting the display effect from being affected.

Optionally, when the QD structure 1022 includes at least one of a red QD block R and a green QD block G, the target color filter layer 1023 includes at least one color filter block which is in a one-to-one correspondence with the at least one QD block, and each color filter block is configured to transmit light emitted by a corresponding QD block and absorb light different from the light emitted by the corresponding QD block. For example, referring to FIG. 5, the target color filter layer 1023 may include a red color filter block R' and a green color filter block G'. An orthographic projection of the red color filter block R' onto the base substrate 101 covers an orthographic projection of the red QD block R onto the base substrate 101. An orthographic projection of the green color filter block G' on the base substrate 101 covers an orthographic projection of the green QD block G onto the base substrate 101. The red color filter block R' is configured to transmit red light emitted by the red QD block R and absorb light different from the red light (for example, blue light). The green color filter block G' is configured to transmit green light emitted by the green QD block G and absorb light different from the green light (for example, blue light).

Optionally, referring to FIG. 5, the display substrate may further include a blue color filter block B' located between the blue QD block B and the base substrate 101. An orthographic projection of the blue color filter block B' onto the base substrate 101 covers an orthographic projection of the blue QD block B onto the base substrate 101. The blue color filter block B' is configured to transmit blue light emitted by the blue QD block B and absorb light different from the blue light emitted by the blue QD block B (for example, red light and green light).

Optionally, each QD block (for example, the red QD block R, the green QD block G or the blue QD block B) in the embodiments of the present disclosure may be located in one sub-pixel region in the display substrate. Each QD block is part of structure of one sub-pixel structure in the display device to which the display substrate belongs. When the display substrate includes all the red QD block R, the green QD block G, and the blue QD block B, three sub-pixel regions in which the red QD block R, the green QD block G, and the blue QD block B are located may form one pixel region in the display substrate.

In summary, the display substrate provided in the embodiments of the present disclosure includes a transflective layer and a QD structure that are sequentially stacked in a direction away from a base substrate. When light in a first wavelength range enters from a side, away from the transflective layer, of the QD structure, the QD structure can be excited by the light in the first wavelength range to emit light in a second wavelength range. Since the transflective layer can reflect the light in the first wavelength range and transmit the light in the second wavelength range, after a part of the light in the first wavelength range is transmitted through the QD structure, the transflective layer can reflect the part of the light in the first wavelength range to the QD structure, so as to excite the QD structure to emit light. On one hand, the utilization of the light in the first wavelength range can be improved. On the other hand, a cross-color interference phenomenon, caused by the emergence of light in the first wavelength range, transmitted through the QD structure, from the base substrate, can be avoided, thereby ensuring the display effect of the display substrate.

Embodiments of the present disclosure provide a display device. The display device includes the display substrate shown in any one of FIG. 1 to FIG. 5.

Figure 6:
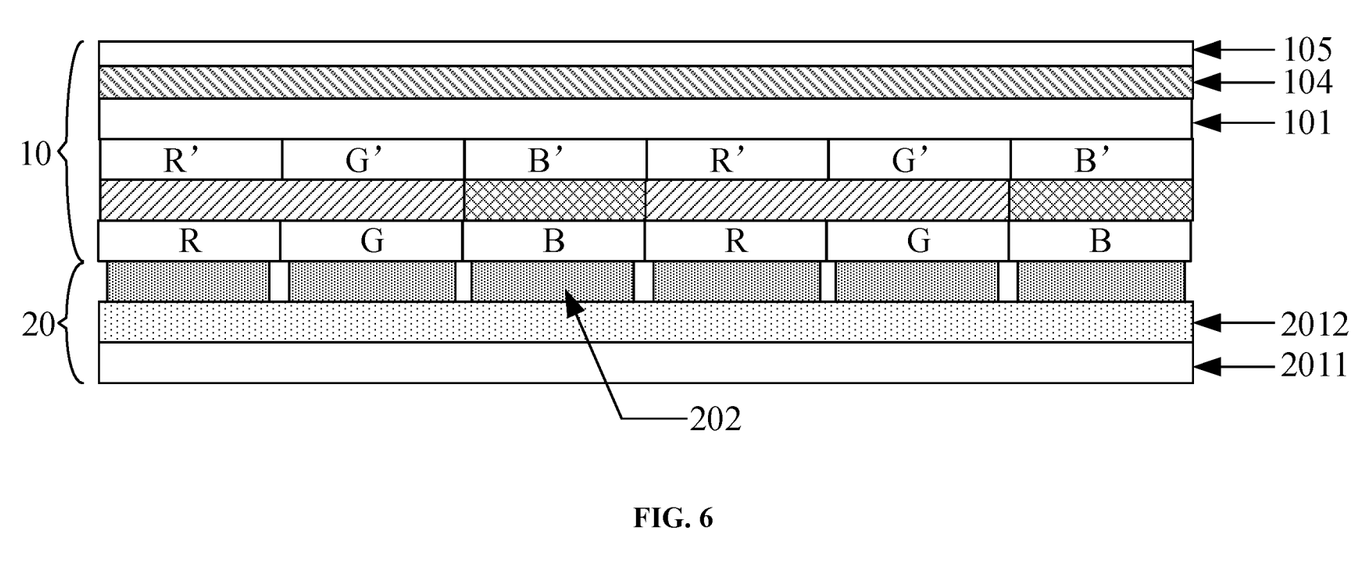
FIG. 6 is a schematic structural diagram of a display device according to some embodiments of the present disclosure.

Optionally, FIG. 6 is a schematic structural diagram of a display device according to some embodiments of the present disclosure. As shown in FIG. 6, the display device includes a light-emitting substrate 20 and the display substrate 10 shown in FIG. 5. The light-emitting substrate 20 is located on a side, away from the base substrate 101, of a plurality of QD blocks. The light-emitting substrate 20 is configured to provide light in a first wavelength range (for example, blue light) to the display substrate 10.

For example, referring to FIG. 6, the light-emitting substrate 20 includes an auxiliary substrate 2011 and at least one light-emitting unit 202 arranged in an array on the auxiliary substrate 2011. The light-emitting unit 202 in the light-emitting substrate 20 may be disposed in a correspondence with a QD block in the display substrate. The light-emitting unit 202 is configured to provide the light in the first wavelength range to the corresponding QD block.

Further, the light-emitting substrate 20 may further include at least one driving circuit 2012 located on the auxiliary substrate 2011. The at least one driving circuit 2012 is in a one-to-one correspondence with the at least one light-emitting unit 202. Each driving circuit 2012 is configured to drive a corresponding light-emitting unit 202 to emit light. For example, the driving circuit 2012 may include one or more thin film transistors (TFTs). The driving circuit 2012 may further include a capacitor. This is not limited in the embodiments of the present disclosure.

Optionally, the light-emitting unit 202 may be a micro LED or a mini LED.

Optionally, the display device may be any product or component having a display function, for example, a display panel, electronic paper, a mobile phone, a tablet computer, a television, a display, a notebook computer, a digital photo frame or a navigation device.

In summary, the display device provided in the embodiments of the present disclosure includes a transflective layer and a QD structure that are sequentially stacked in a direction away from a base substrate. When light in a first wavelength range enters from a side, away from the transflective layer, of the QD structure, the QD structure can be excited by the light in the first wavelength range to emit light in a second wavelength range. Since the transflective layer can reflect the light in the first wavelength range and transmit the light in the second wavelength range, after a part of the light in the first wavelength range is transmitted through the QD structure, the transflective layer can reflect the part of the light in the first wavelength range to the QD structure, so as to excite the QD structure to emit light. On one hand, the utilization of the light in the first wavelength range can be improved. On the other hand, a cross-color interference phenomenon, caused by the emergence of light in the first wavelength range, transmitted through the QD structure, from the base substrate, can be avoided, thereby ensuring the display effect of the di splay substrate.

Figure 7:
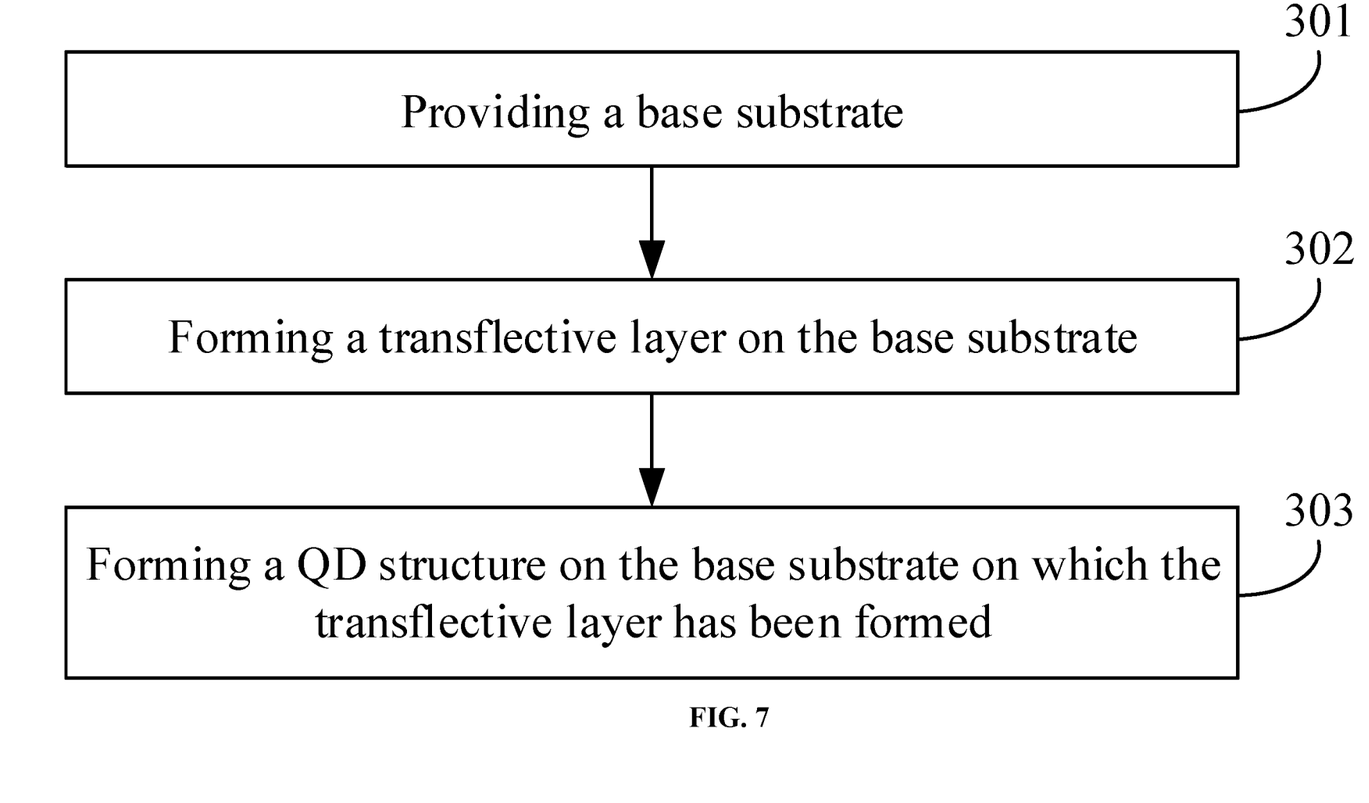
FIG. 7 is a flowchart of a method for manufacturing a display substrate according to some embodiments of the present disclosure.

FIG. 7 is a flowchart of a method for manufacturing a display substrate according to some embodiments of the present disclosure. As shown in FIG. 7, the method includes the following steps 301-303.

In step 301, a base substrate is provided.

In step 302, a transflective layer is formed on the base substrate.

In step 303, a QD structure is formed on the base substrate on which the transflective layer has been formed.

Referring to FIG. 1, the QD structure 1022 is configured to emit light in a second wavelength range under excitation by light in a first wavelength range. The second wavelength range is outside the first wavelength range. The transflective layer 1021 is configured to reflect the light in the first wavelength range and transmit the light in the second wavelength range.

In summary, a display substrate manufactured by using the method provided in the embodiments of the present disclosure includes a transflective layer and a QD structure that are sequentially stacked in a direction away from a base substrate. When light in a first wavelength range enters from a side, away from the transflective layer, of the QD structure, the QD structure can be excited by the light in the first wavelength range to emit light in a second wavelength range. Since the transflective layer can reflect the light in the first wavelength range and transmit the light in the second wavelength range, after a part of the light in the first wavelength range is transmitted through the QD structure, the transflective layer can reflect the part of the light in the first wavelength range to the QD structure, so as to excite the QD structure to emit light. On one hand, the utilization of the light in the first wavelength range can be improved. On the other hand, a cross-color interference phenomenon, caused by the emergence of light in the first wavelength range, transmitted through the QD structure, from the base substrate, can be avoided, thereby ensuring the display effect of the display substrate.

Figure 8:
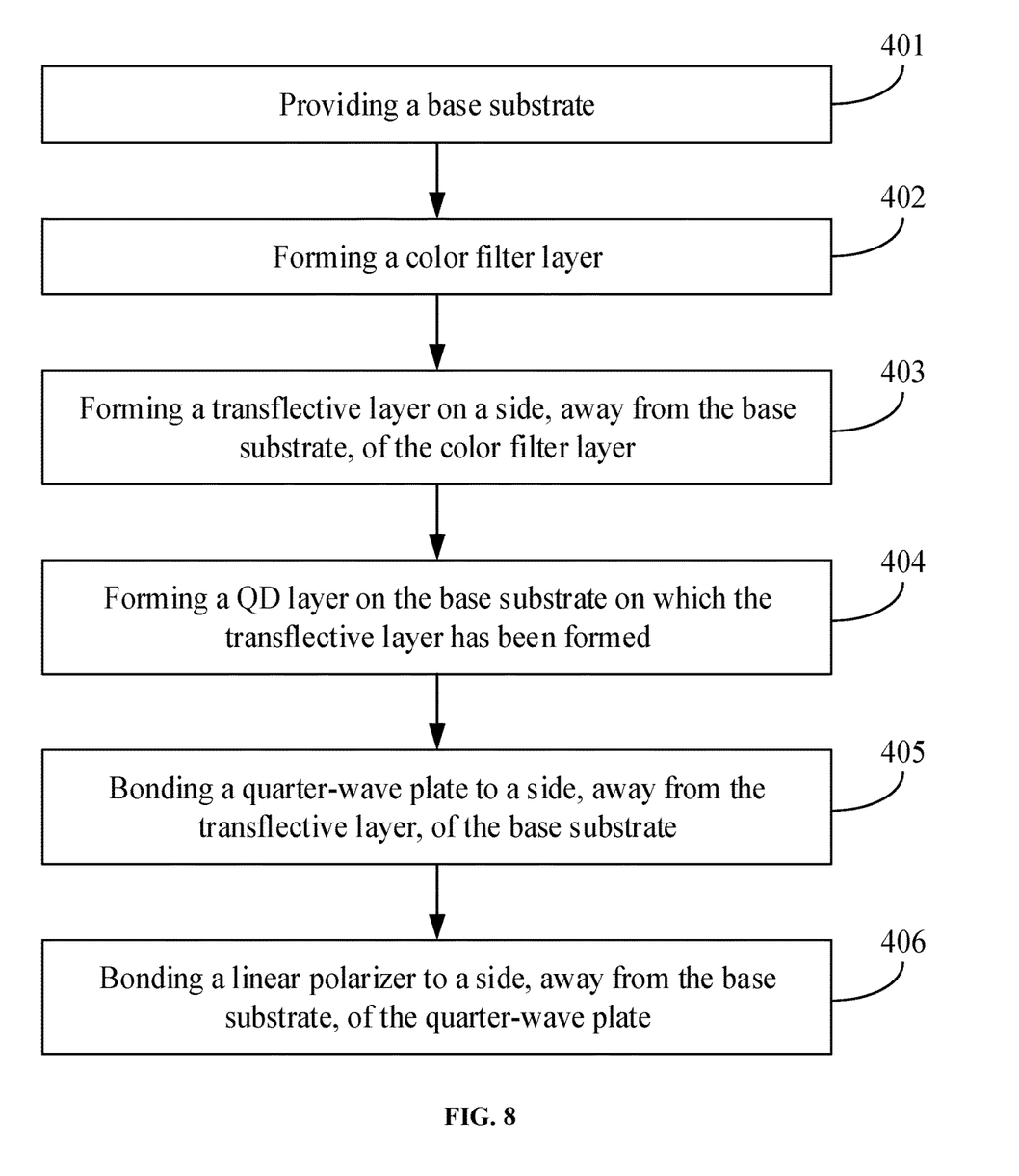
FIG. 8 is a flowchart of another method for manufacturing a display substrate according to some embodiments of the present disclosure.

FIG. 8 is a flowchart of another method for manufacturing a display substrate according to some embodiments of the present disclosure. As shown in FIG. 8, the method includes steps 401-403.

In step 401, a base substrate is provided.

Optionally, the base substrate may be made of a flexible material (for example, polyimide) or a transparent material such as glass, a silicon wafer, quartz or plastic. The material of the base substrate is not limited in the embodiments of the present disclosure.

In step 402, a color filter layer is formed on the base substrate.

Optionally, the color filter layer includes the above target color filter layer. The color filter layer may include the blue color filter block. Optionally, the color filter layer may be formed on the base substrate by using a patterning process. For example, a red color filter block, a green color filter block, and a blue color filter block may be sequentially formed on the base substrate by using respective one-time patterning process. In the embodiments of the present disclosure, the patterning process includes: photoresist coating, exposure, development, etching, and photoresist peeling-off. Alternatively, the color filter layer may be bonded on the base substrate. The manner in which the color filter layer is disposed is not limited in the embodiments of the present disclosure.

In step 403, a transflective layer is formed on a side, away from the base substrate, of the color filter layer.

Optionally, a cholesteric phase liquid crystal material layer is formed on the base substrate by spin coating; and the cholesteric phase liquid crystal material layer in a remaining region is removed by an exposure and development process to obtain the transflective layer including the cholesteric phase liquid crystal layer. The remaining region is a region other than a region in which the target color filter layer is located.

In a possible implementation, the cholesteric phase liquid crystal layer includes a left-handed cholesteric phase liquid crystal layer and a right-handed cholesteric phase liquid crystal layer that are stacked in a direction away from the base substrate. In this case, a process of forming the cholesteric phase liquid crystal material layer on the base substrate by spin coating includes: forming the left-handed cholesteric phase liquid crystal material layer on the base substrate by spin coating; and forming the right-handed cholesteric phase liquid crystal material layer on a side, away from the base substrate, of the left-handed cholesteric phase liquid crystal layer by spin coating.

In another possible implementation, the cholesteric phase liquid crystal layer includes a right-handed cholesteric phase liquid crystal layer and a left-handed cholesteric phase liquid crystal layer that are stacked in a direction away from the base substrate. In this case, a process of forming the cholesteric phase liquid crystal material layer on the base substrate by spin coating includes: forming the right-handed cholesteric phase liquid crystal material layer on the base substrate by spin coating; and forming the left-handed cholesteric phase liquid crystal material layer on a side, away from the right-handed cholesteric phase liquid crystal layer, of the base substrate by spin coating.

In the foregoing two implementations, two exposure and development processes may be used to separately remove the right-handed cholesteric phase liquid crystal material layer and the left-handed cholesteric phase liquid crystal material layer in a remaining region. Alternatively, one exposure and development process may be used to remove the right-handed cholesteric phase liquid crystal material layer and the left-handed cholesteric phase liquid crystal material layer in the remaining region. This is not limited in the embodiments of the present disclosure.

In step 404, a QD layer is formed on the base substrate on which the transflective layer has been formed.

Referring to the display substrate shown in any one of FIG. 1 to FIG. 5, the QD layer may include a plurality of QD blocks. The plurality of QD blocks include the QD structure 1022. Optionally, when the QD structure 1022 includes a red QD block R and a green QD block G, a red QD material may be used to form the red QD block R on a side, away from the base substrate 101, of the transflective layer 1021 by using a patterning process, and a green QD material may be used to form a green QD block G on a side, away from the base substrate 101, of the transflective layer 1021 by using a patterning process.

Optionally, the plurality of QD blocks further include a blue QD block.

In a possible implementation, in a region in which the transflective layer is not disposed on the base substrate, a blue QD material is used to form the blue QD block by using a patterning process, and the thickness of the blue QD block is equal to a sum of the thickness of the transflective layer and the thickness of the QD structure.

In another possible implementation, in a region in which the transflective layer is not disposed on the base substrate, an organic material is used to form a planarization layer by using a patterning process, and the thickness of the planarization layer is equal to the thickness of the transflective layer. Alternatively, before a plurality of QD blocks are formed, the planarization layer is formed as a whole layer on the base substrate on which the transflective layer has been formed, and the plurality of QD blocks are then formed on the planarization layer.

In another possible embodiment of the present disclosure, the plurality QD blocks may not include blue QD block. In this case, in a region in which the transflective layer is not disposed on the base substrate, an organic material may be used to form the planarization layer by using a patterning process, and the thickness of the planarization layer is equal to a sum of the thickness of the transflective layer and the thickness of the QD structure.

In step 405, a quarter-wave plate is bonded to a side, away from the transflective layer, of the base substrate.

In step 406, a linear polarizer is bonded to a side, away from the base substrate, of the quarter-wave plate.

It should be noted that in the embodiments of the present disclosure, as an example, if the quarter-wave plate and the linear polarizer form a circular polarizer, steps 405 and 406 maybe omitted. Instead, a circular polarizer formed by liquid crystal may be directly formed on a side, away from the transflective layer, of the base substrate.

Optionally, a reference can be made to FIG. 5 for the structure of the display substrate manufactured by using the method for manufacturing a display substrate shown in FIG. 8.

It should be noted that the sequence of the steps in the method for manufacturing a display substrate provided in the embodiments of the present disclosure may be appropriately adjusted. For example, step 405 and step 406 may be performed prior to step 402. Steps may be correspondingly added or omitted as required. For example, step 402 may be omitted, and step 405 and step 406 may be omitted. Any method that can be easily conceived by a person skilled in the art within the technical scope of the present disclosure should fall within the protection scope of the present disclosure, and therefore details are not described again.

In summary, a display substrate manufactured by using the method provided in the embodiments of the present disclosure includes a transflective layer and a QD structure that are sequentially stacked in a direction away from a base substrate. When light in a first wavelength range enters from a side, away from the transflective layer, of the QD structure, the QD structure can be excited by the light in the first wavelength range to emit light in a second wavelength range. Since the transflective layer can reflect the light in the first wavelength range and transmit the light in the second wavelength range, after a part of the light in the first wavelength range is transmitted through the QD structure, the transflective layer can reflect the part of the light in the first wavelength range to the QD structure, so as to excite the QD structure to emit light. On one hand, the utilization of the light in the first wavelength range can be improved. On the other hand, a cross-color interference phenomenon, caused by the emergence of light in the first wavelength range, transmitted through the QD structure, from the base substrate, can be avoided, thereby ensuring the display effect of the display substrate.

In the foregoing embodiments, the functions of various structures in the display substrate have been described in detail in the embodiments related to the display substrate, and details are not described herein.

The foregoing descriptions are merely optional embodiments of the present disclosure, and are not intended to limit the present disclosure. Within the spirit and principles of the disclosure, any modifications, equivalent substitutions, improvements, etc., are within the protection scope of the present disclosure.

What is claimed is:

1. A display substrate, comprising a base substrate, and a transflective layer and a quantum dot (QD) structure that are sequentially stacked in a direction away from the base substrate, wherein
   the QD structure is configured to emit light in a second wavelength range under excitation by light in a first wavelength range, the second wavelength range is outside the first wavelength range, and the transflective layer is configured to reflect the light in the first wavelength range and transmit the light in the second wavelength range;
   wherein the light in the second wavelength range is excited light, and the light in the first wavelength range is light used for excitation; and when the light used for excitation is provided from a side, away from the transflective layer, of the QD structure, a part of the light used for excitation, being transmitted through the QD structure, is reflected by the transflective layer to the QD structure, and then is used to excite the QD structure to emit the excited light;
   wherein the display substrate further comprises a target color filter layer located between the transflective layer and the base substrate, and the target color filter layer is configured to absorb the light in the first wavelength range;

wherein the QD structure comprises a red QD block and a green QD block, and the target color filter layer comprises color filter blocks which are in a one-to-one correspondence with the QD blocks comprised in the QD structure, and each color filter block is configured to transmit light emitted by a corresponding QD block and absorb light in a different color from the light emitted by the corresponding QD block.

2. The display substrate according to claim 1, wherein the transflective layer comprises at least one of a left-handed cholesteric phase liquid crystal layer or a right-handed cholesteric phase liquid crystal layer.

3. The display substrate according to claim 1, wherein the display substrate satisfies at least one of the following conditions:
an orthographic projection of the QD structure onto the base substrate is located in an orthographic projection of the transflective layer onto the base substrate.

4. The display substrate according to claim 1, wherein the light in the first wavelength range comprises blue light, and the QD structure comprises at least one of a red QD block and a green QD block, wherein
the red QD block is configured to emit red light under excitation by the blue light, and the green QD block is configured to emit green light under excitation by the blue light.

5. The display substrate according to claim 1, wherein the display substrate further comprises a blue QD block located in the same layer as the QD structure, and the blue QD block is configured to emit blue light under excitation by the light in the first wavelength range.

6. The display substrate according to claim 5, wherein the display substrate satisfies any of the following conditions:
a thickness of the blue QD block is equal to a sum of a thickness of the QD structure and a thickness of the transflective layer; and
the display substrate further comprises a planarization layer between the blue QD block and the base substrate, and a sum of the thickness of the blue QD block and a thickness of the planarization layer is equal to a sum of the thickness of the QD structure and the thickness of the transflective layer.

7. The display substrate according to claim 5, wherein the display substrate further comprises a blue color filter block located between the blue QD block and the base substrate; and
the blue color filter block is configured to transmit light emitted by the blue QD block and absorb light different from the light emitted by the blue QD block.

8. The display substrate according to claim 1, wherein the display substrate further comprises a planarization layer located in the same layer as the QD structure, and a thickness of the planarization layer is equal to a sum of a thickness of the QD structure and a thickness of the transflective layer.

9. The display substrate according to claim 1, wherein the display substrate further comprises a circular polarizer located on a side, away from the transflective layer, of the base substrate.

10. The display substrate according to claim 9, wherein the circular polarizer satisfies at least one of the following conditions;
the circular polarizer comprises a quarter-wave plate and a linear polarizer sequentially arranged in a direction away from the base substrate; and
the circular polarizer is a left-handed circular polarizer.

11. The display substrate according to claim 1, wherein the light in the first wavelength range comprises blue light, the transflective layer comprises at least one of a left-handed cholesteric phase liquid crystal layer and a right-handed cholesteric phase liquid crystal layer, an orthographic projection of the QD structure onto the base substrate is located in an orthographic projection of the transflective layer onto the base substrate, the display substrate further comprises a circular polarizer located on a side, away from the transflective layer, of the base substrate, the circular polarizer comprises a quarter-wave plate and a linear polarizer sequentially arranged in a direction away from the base substrate, and the circular polarizer is a left-handed circular polarizer;
the display substrate satisfies any of the following conditions:
the display substrate further comprises a planarization layer, the planarization layer and the QD structure are located in the same layer, and a thickness of the planarization layer is equal to a sum of a thickness of the QD structure and a thickness of the transflective layer; or
the display substrate further comprises a blue QD block, the planarization layer, and a blue color filter block, and the blue QD block, the planarization layer; and the blue color filter block are sequentially arranged in a direction toward the base substrate, the blue QD block and the QD structure are located in the same layer, a sum of a thickness of the blue QD block and the thickness of the planarization layer is equal to the sum of the thickness of the QD structure and the thickness of the transflective layer, the blue QD block is configured to emit blue light under excitation by the light in the first wavelength range, and the blue color filter block is configured to transmit light emitted by the blue QD block and absorb light different from the light emitted by the blue QD block.

12. A method for manufacturing a display substrate, comprising:
providing a base substrate;
forming a transflective layer on the base substrate; and
forming a quantum dot (QD) structure on the base substrate on which the transflective layer has been formed, wherein
the QD structure is configured to emit light in a second wavelength range under excitation by light in a first wavelength range, the second wavelength range is outside the first wavelength range, and the transflective layer is configured to reflect the light in the first wavelength range and transmit the light in the second wavelength range;
wherein the light in the second wavelength range is excited light, and the light in the first wavelength range is light used for excitation; and when the light used for excitation is provided from a side, away from the transflective layer, of the QD structure, a part of the light used for excitation, being transmitted through the QD structure, is reflected by the transflective layer to the QD structure, and then is used to excite the QD structure to emit the excited light;
wherein the display substrate further comprises a target color filter layer located between the transflective layer and the base substrate, and the target color filter layer is configured to absorb the light in the first wavelength range;
wherein the QD structure comprises a red QD block and a green QD block, and the target color filter layer comprises color filter blocks which are in a one-to-one correspondence with the QD blocks comprised in the QD structure, and each color filter block is configured to transmit light emitted by a corresponding QD block and absorb light in a different color from the light emitted by the corresponding QD block.

13. A display device, comprising the display substrate according to claim 1.

14. The display device according to claim 13, further comprising a light-emitting substrate located on a side, away from the base substrate, of the quantum dot (QD) structure, and the light-emitting substrate is configured to provide light in a first wavelength range to the display substrate.

15. The display device according to claim 14, wherein the light in the first wavelength range comprises blue light.

16. The display device according to claim 14, wherein the light-emitting substrate comprises an auxiliary substrate and at least one light-emitting unit located on the auxiliary substrate, the light-emitting unit is disposed corresponding to a QD block in the display substrate, and the light-emitting unit is configured to provide the light in the first wavelength range to the corresponding QD block.

17. The display device according to claim 16, wherein the light-emitting unit comprises at least one of a micro light-emitting diode (LED) and a mini LED.

18. The display device according to claim 17, wherein the light in the first wavelength range comprises blue light.

19. A display substrate, comprising a base substrate, and a transflective layer and a quantum dot (QD) structure that are sequentially stacked in a direction away from the base substrate, wherein the QD structure is configured to emit light in a second wavelength range under excitation by light in a first wavelength range, the second wavelength range is outside the first wavelength range, and the transflective layer is configured to reflect the light in the first wavelength range and transmit the light in the second wavelength range;

wherein the light in a second wavelength range is excited light, and the light in a first wavelength range is light used for excitation, when the light used for excitation is provided form a side, away from the transflective layer, of the QD structure, a part of the light used for excitation transmitted through the QD structure is reflected by the transflective layer to the QD structure, and then is used to excite the QD structure to emit the excited light;

wherein the display substrate further comprises a planarization layer located in the same layer as the QD structure, and a thickness of the planarization layer is equal to a sum of a thickness of the QD structure and a thickness of the transflective layer.

20. The display substrate according to claim 19, wherein the light in the first wavelength range comprises blue light, the transflective layer comprises at least one of a left-handed cholesteric phase liquid crystal layer and a right-handed cholesteric phase liquid crystal layer, an orthographic projection of the QD structure onto the base substrate is located in an orthographic projection of the transflective layer onto the base substrate, the QD structure comprises at least one of a red QD block and a green QD block, the display substrate further comprises a target color filter layer located between the transflective layer and the base substrate, and the target color filter layer is configured to absorb the light in the first wavelength range, the target color filter layer comprises at least one color filter block which is in a one-to-one correspondence with the at least one QD block, and each color filter block is configured to transmit light emitted by a corresponding QD block and absorb light different from the light emitted by the corresponding QD block, the display substrate further comprises a circular polarizer located on a side, away from the transflective layer, of the base substrate, the circular polarizer comprises a quarter-wave plate and a linear polarizer sequentially arranged in a direction away from the base substrate, and the circular polarizer is a left-handed circular polarizer.

* * * * *